(12) United States Patent
Pitschke

(10) Patent No.: US 8,001,815 B2
(45) Date of Patent: Aug. 23, 2011

(54) DEVICE FOR STARTING AND OPERATING AN ENGINE IN A MOTOR VEHICLE

(75) Inventor: Andre Pitschke, Wuppertal (DE)

(73) Assignee: Huf Hüsbeck & Fürst GmbH & Co. KG, Velbert (DE)

( * ) Notice: Subject to any disclaimer, the term of this patent is extended or adjusted under 35 U.S.C. 154(b) by 986 days.

(21) Appl. No.: 11/918,309

(22) PCT Filed: Mar. 17, 2006

(86) PCT No.: PCT/EP2006/002443
§ 371 (c)(1),
(2), (4) Date: Oct. 10, 2007

(87) PCT Pub. No.: WO2006/108485
PCT Pub. Date: Oct. 19, 2006

(65) Prior Publication Data
US 2009/0025439 A1  Jan. 29, 2009

(30) Foreign Application Priority Data
Apr. 12, 2005 (DE) .......................... 10 2005 016 649

(51) Int. Cl.
*E05B 11/00* (2006.01)
*E05B 65/12* (2006.01)
(52) U.S. Cl. ............. 70/389; 70/252; 70/278.2; 70/387; 70/429
(58) Field of Classification Search .................. 70/252, 70/278.2, 360, 361, 387, 388, 389, 390, 423, 70/427, 429, 455
See application file for complete search history.

(56) References Cited

U.S. PATENT DOCUMENTS
3,851,505 A * 12/1974 Wilkinson ...................... 70/255
(Continued)

FOREIGN PATENT DOCUMENTS
EP  1 020 592  7/2000
(Continued)

*Primary Examiner* — Suzanne D Barrett
*Assistant Examiner* — Christopher Boswell
(74) *Attorney, Agent, or Firm* — Lucas & Mercanti, LLP; Klaus P. Stoffel

(57) ABSTRACT

Disclosed is a device for starting and operating an engine in a motor vehicle. Said device comprises an ID generator (20) which can be inserted into a stationary receptacle of the motor vehicle and is provided with an engaging means (25.1, 25.2) on at least one sidewall. At least one lever (30.1, 30.2) of the first class that encompasses a retaining arm and a control arm (32.1, 32.2) is used for retaining the ID generator (20) in the receptacle. The retaining arm is fitted with opposite engaging means (25.1, 25.2) while the control arm (32.1, 32.2) is equipped with a control point for the swiveling movement of the lever (30.1, 30.2) as well as a locking point (34.1) for a locking device which secures the inserted position of the ID generator (20). In order to embody the inventive device in a compact manner, a stationarily pivot-mounted elbow lever (30.1, 30.2) whose control arm (32.1, 32.2) extends perpendicular to the direction of insertion of the ID generator (20) is used in the receptacle. The inserted end of the ID generator (20) is provided with an opposite control point (38) which acts upon the control point (33.1) of the control arm (32.1). The locking means (40) of the locking device can be moved perpendicular to the swivel plane of the control arm (32.1, 32.2) between a locked position and a released position.

23 Claims, 2 Drawing Sheets

U.S. PATENT DOCUMENTS

| | | | |
|---|---|---|---|
| 5,254,996 A * | 10/1993 | Claar et al. | 341/176 |
| 6,389,856 B1 * | 5/2002 | Watanuki et al. | 70/252 |
| 6,539,762 B1 * | 4/2003 | Wittwer | 70/252 |
| 6,546,768 B1 * | 4/2003 | Burghoff et al. | 70/252 |
| 6,776,016 B1 | 8/2004 | Wittwer et al. | |
| 7,334,441 B1 * | 2/2008 | Amundson et al. | 70/252 |
| 7,392,675 B2 * | 7/2008 | Kito | 70/252 |
| 7,581,422 B2 * | 9/2009 | Schindler | 70/252 |

FOREIGN PATENT DOCUMENTS

| | | |
|---|---|---|
| EP | 1 462 325 | 9/2004 |
| EP | 1 465 223 | 10/2004 |
| JP | 2004058731 | 2/2004 |

\* cited by examiner

DEVICE FOR STARTING AND OPERATING AN ENGINE IN A MOTOR VEHICLE

The invention concerns a device of the type specified in the introductory clause of claim 1. An electronic key or an identification card, also known as a smart card, can be used as an identification transmitter or ID transmitter for short.

The ID transmitter must be secured in the correct inserted position in a stationary slot of the motor vehicle. A two-armed lever with a supporting arm and a control arm is mounted in the slot for this purpose. The supporting arm extends essentially in the direction of insertion of the ID transmitter and has an securing means, which, in the correct inserted position, fits into the engaging device in the inserted ID transmitter and thus secures the ID transmitter in the slot. By contrast, the control arm has a control point and a locking point. The control point is for a swiveling movement of the lever in the direction of engagement of the engaging device and securing means. The locking point, on the other hand, cooperates with a locking device, which secures the ID transmitter in its inserted position.

EP 1 020 592 discloses a device of this type. The slot is located inside a rotary knob, which is moved axially for ignition and starting. Two two-armed levers are located in the slot, and their arms extend end to end. Both the supporting arm and the control arm extend essentially in the direction of insertion of the ID transmitter. During the axial movement of the rotary knob, the two levers also carry out an axial movement, whereby the control points located at the end of the control arm run into stationary axial projections inside the slot. This initially causes a swiveling movement of the levers. The stationary axial projections simultaneously serve as locking devices for securing the ID transmitter in its inserted position. The supporting arms, which are swiveled towards each other, have hook ends that act as securing means, which move into corresponding recesses, which serve as engaging devices, in the sidewall of the ID transmitter. The disadvantage of this previously known device is its relatively great axial depth dimension. This requires a correspondingly large amount of space in the motor vehicle, which is therefore no longer available for other important parts.

The objective of the invention is to develop a reliable device of the type specified in the introductory clause of claim 1, which is designed to save space. This objective is achieved by the measures specified in claim 1, which have the following special significance.

By designing the lever as an angle lever, the invention already achieves a short axial depth dimension. However, this small depth is also obtained because stationary control means for the swiveling movement of the angle lever are unnecessary; specifically, the insertion end of the ID transmitter acts as an opposing control point for the control arm of the angle lever. When the ID transmitter is inserted, this opposing control point strikes the control point of the control arm and thus forces the swiveling movement to be initiated. The ID transmitter itself thus produces the swiveling of the angle lever in the direction of engagement of the engaging device and securing means. Finally, the axial depth dimension is also not wasted by the locking device, because it can move transversely to the swivel plane of the control arm between its two positions, namely a locked position, in which the locking device acts on the locking point of the control arm, and a released position, in which the locking device releases the locking point.

Additional measures and advantages of the invention are specified in the dependent claims and the description which follows and are illustrated in the drawings. The drawings show a specific embodiment of the invention only with respect to its most important components.

Figure 1:
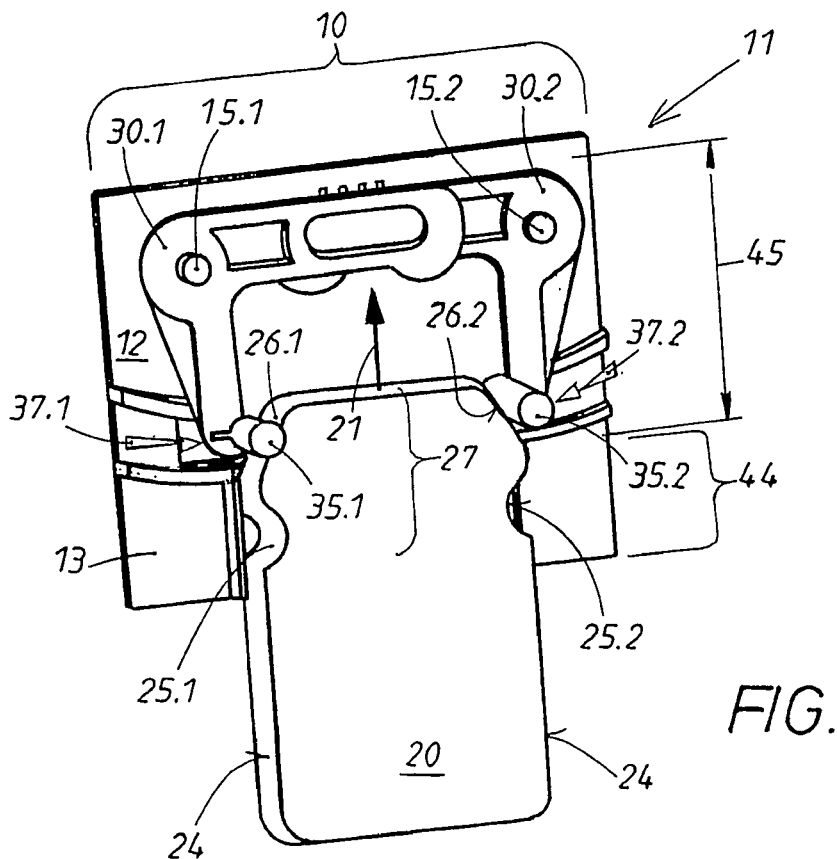
FIG. 1 shows the internal components of a stationary slot in a motor vehicle in the initial phase of insertion of an ID transmitter.

A loose ID transmitter is in the possession of its authorized user. When it is to be used, it is inserted in the direction of arrow 21 into a stationary slot 10, which is indicated in the drawings only in its position. The only internal components 11 of the slot 10 that are shown in the drawings are those which interact with the ID transmitter 20 and serve to bound the slot 10 on one of its sides. As illustrated by dot-dash lines in FIG. 4, the ID transmitter has an essentially rectangular cross section 22 with two opposite wide sides 23 and two opposite narrow sides 24. The narrow sides 24 determine sidewalls of the ID transmitter 20, which extend in the direction of insertion and have engaging devices 25.1, 25.2 opposite each other. In the present case, these engaging devices consist of recesses 25.1, 25.2.

The internal components 11 comprise a mounting plate 12, on whose inner surface 13 facing the slot 10 two pivot pins 15.1, 15.2 are mounted, which serve the purpose of pivoting two angle levers 30.1, 30.2. The two angle levers 30.1, 30.2 are designed with the same shape but are arranged relative to each other in mirror-inverted positions. Therefore, starting with a uniform design of an angle lever, the angle lever is then used on the mounting plate 12 in two positions 30.1, 30.2 that are turned about relative to each other. The angle levers 30.1, 30.2 have the following corresponding design, which will be explained with reference to FIG. 2.

One arm 31.1, 31.2 of the angle lever 30.1, 30.2 extends essentially in the direction of insertion 21 of the ID transmitter and is referred to as the "supporting arm" for the following reason. Specifically, the end of the supporting arm 31.1, 31.2 has securing means 35.1, 35.2, which are complementary to the previously described engaging devices 25.1, 25.2 of the ID transmitter 20. In the present case, the securing means consists of a pin at the end of the arm.

The other arm 32.1, 32.2 of the two angle levers 30.1, 30.2, on the other hand, extends essentially transversely to the direction of insertion 21 of the ID transmitter 20 and is referred to as the "control arm" for short for the following reason. The ends of the two control arms 32.1, 32.2 overlap and each has a control point 33.1, 33.2, which in the present case consists of a projection 33.1, 33.2, which projects in the direction opposite the direction of insertion 21 of the ID transmitter 20. In addition, the two control arms 32.1, 32.2 have openings 34.1, 34.2, which serve as "locking points" for a latch 40 (shown in FIGS. 3 and 4) of a locking mechanism (not shown in detail).

During the insertion operation 21, the inner surface 13 of the mounting plate 12 also has the function of a guide surface for the ID transmitter 20, because one of the wide sides 23 of the ID transmitter 20 is supported there. Additional guide surfaces for the ID transmitter 20 are formed by two guide webs 26.1, 26.2, which extend upward on the inner surface 13 of the mounting plate 12 and interact with the two sidewalls 24 of the ID transmitter 20.

Figure 4:
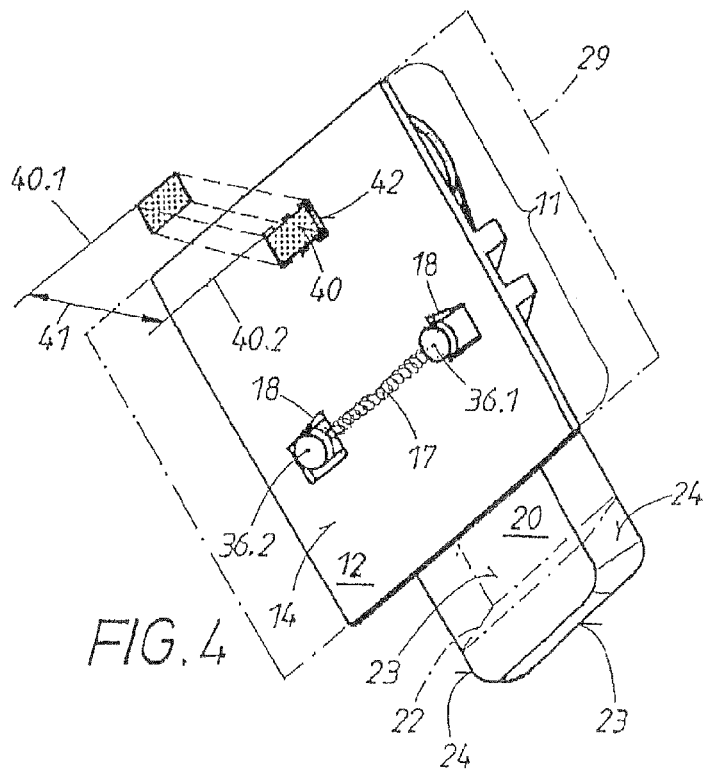
FIG. 4 shows a rear view of the components shown in FIG. 3.

Each of the two angle levers 30.1, 30.2 is under the action of spring force 37.1, which are illustrated by a force arrow in FIG. 1. These spring forces 37.1, 37.2 are produced by a common tension spring 17, which is shown in FIG. 4. The tension spring 17 engages two pins 36.1, 36.2 of the two angle levers 30.1, 30.2, which are formed on the free ends of the two supporting arms 31.1, 31.2. Each of the two pins 36.1, 36.2 passes through an opening 18 in the mounting plate 12 and extends from the rear side 14 (shown in FIG. 4) of the mounting plate 12. The tension spring 17 is also located there. The two angle levers 30.1, 30.2 are spring-loaded in opposite directions towards each other by the tension spring 17, as indicated by the aforementioned force arrows 37.1, 37.2 in FIG. 1. The two openings 18 and the two pins 26.1, 26.2 also serve as end stops, which determine the normal position of the two angle levers 30.1, 30.2 shown in FIG. 1. During the process of inserting 21 the ID transmitter 20, the internal components 11 pass through the following operating phases.

Figure 2:
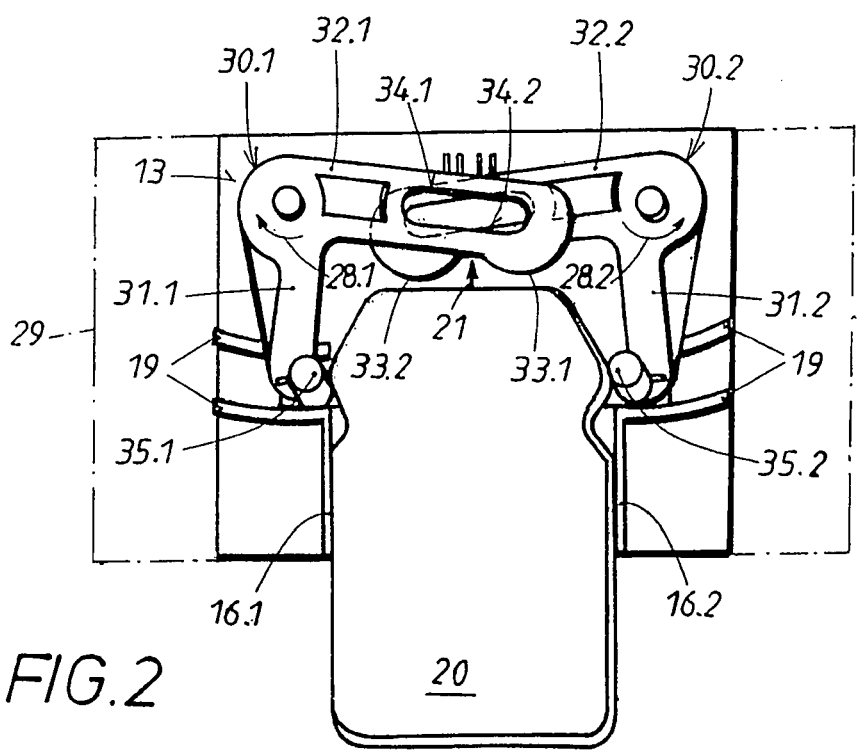
FIG. 2 shows a view analogous to that of FIG. 1 in the intermediate phase of insertion of the ID transmitter into the slot.

As noted above, FIG. 1 shows the normal position of the two angle levers 30.1, 30.2 before the ID transmitter 20 is inserted. When the ID transmitter 20 is inserted, as shown in FIG. 1, the lugs 35.1, 35.2 located at the ends of the supporting arms strike inclined surfaces 26.1, 26.2, which are located on the insertion end 27 of the ID transmitter 20 and extend towards each other in opposite directions. Consequently, as the ID transmitter 20 is further inserted 21, the two angle levers 30.1, 30.2 are swung away from each other—against their respective spring forces 37.1, 37.2—in the direction indicated by the rotational arrows 28.1, 28.2 in FIG. 2. FIG. 2 thus shows an intermediate phase of the swiveling movement 28.1, 28.2. The swiveling movement 28.1, 28.2 of the two angle levers 30.1, 30.2 occurs on the aforementioned inner surface 13 of the mounting plate 12, which thus determines the common swivel plane 29 of these levers 30.1, 30.2, as indicated by the dot-dash line in FIG. 2. As the drawing shows, the lugs 35.1, 35.2 extend essentially perpendicularly to this swivel plane 29. The same is true of the pins 36.1, 36.2, which are oriented in the opposite direction from the lugs 35.1, 35.2 and are located on the rear side 14 of the mounting plate 12, as shown in FIG. 4. In the present case, the pins 36.1, 36.2 are actually arranged in axial extension of the lugs 35.1, 35.2.

Figure 3:
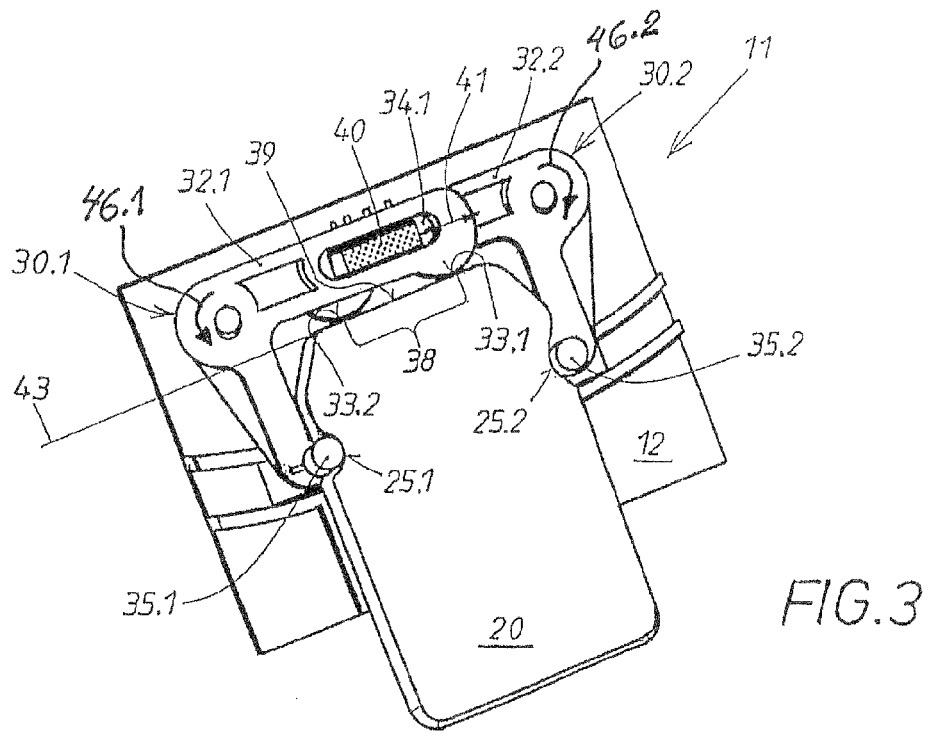
FIG. 3 shows the components shown in FIG. 1 in a locked position, in which the final correct inserted position of the ID transmitter is secured.

FIG. 3 shows the position of complete insertion of the ID transmitter 20 in the components 11. The lugs 35.1, 35.2 have moved into the recesses 25.1, 25.2 of the ID transmitter 20. Although the spring forces 37.1, 37.2 described in connection with FIG. 1 are able to effect this insertion, opposing control points 38 provided at the forward insertion end 27 of the ID transmitter 20 play an important role. In the present case, these opposing control points 38 are formed by the end face 39 of the ID transmitter 20. These opposing control surfaces 38 interact with the aforementioned projections 33.1, 33.2 of the lever control arms 32.1, 32.2 and force the two angle levers 30.1 and 30.2 to swivel back 46.1, 46.2 to their original positions. The engaged position of the lugs 35.1, 35.2 in the recesses 25.1, 25.2 of the ID transmitter 20 is then present, as shown in FIGS. 3 and 4.

Even if the spring 17 were to break, the invention would continue to be fully functional. The reason for this is the aforementioned interaction of the control points 33.1, 33.2 and the opposing control points 38 associated with them. The desired inserted position 43 of the ID transmitter is always achieved in this way. The above-described engaged position of the lugs 35.1, 35.2 with the recesses 25.1, 25.2 is then secured in the following way by the aforementioned latch 40 of a locking mechanism.

The latch 40 is normally in a position 40.1, which is indicated in FIG. 4 by a dot-dash line and is referred to as the "released position" because it allows free swiveling 28.1, 28.2 of the two angle levers 30.1, 30.2. The swiveling movement 28.1, 28.2 can also be supported by guide tracks 19, which lie on the inner surface 13 of the mounting plate 12. These guide tracks 19 engage the ends of the supporting arms 31.1, 31.2, where the lugs 35.1, 35.2 are also mounted.

When the lugs 35.1, 35.2 are in their engaged position in the recesses 25.1, 25.2 of the ID transmitter 20, as shown in FIG. 3, the latch 40 is placed into its locked position 40.2, which is indicated by solid lines in FIGS. 3 and 4. This reversal between the two positions 40.1, 40.2 is illustrated in FIGS. 3 and 4 by an arrow 41. As the drawing shows, this reversal 41 occurs transversely, especially perpendicularly, to the aforementioned swivel plane 29 of the two angle levers 30.1, 30.2, which is indicated by dot-dash lines in FIG. 4. In addition, as shown in FIG. 4, the mounting plate 12 has an opening 42, through which the latch 40 passes to enter its locked position 40.2. In the locked position of FIGS. 3 and 4, the openings 34.1, 34.2 (see FIG. 2) in the two control arms 32.1, 32.2 coincide and thus allow the latch 40 to enter. The openings 34.1, 34.2 are then aligned with each other.

The completely inserted position of the ID transmitter 20 in the slot is marked by the auxiliary line 43. The forces acting on the inserted latch 40 depend on the particular lengths of the control arm 32.1, 32.2 and supporting arm 31.1, 31.2 and their relationship to each other. If the control arm 32.1, 32.2 is relatively long and the supporting arm 31.1, 31.2 relatively short, the locking device 40 can be designed relatively small.

In the inserted position 43, monodirectional or bidirectional communication takes place between the ID transmitter 20 and an ID receiver (not shown) mounted in the vehicle. If this communication is successful, because the correct ID transmitter 20 was inserted, then the various operating positions for operating the engine and vehicle can be initiated by actuating the ID transmitter 20 or a manual control device provided for this purpose. If the ID transmitter 20 inserted in the slot is itself used as the actuator for the operating positions, e.g., as a rotary control device, then it functions as a start-stop button. In the case of a specially provided manual control device, this device can be a rotary knob or a push button.

These operating positions include, for example, a so-called ACC position, in which a steering wheel lock is released after successful identification. The steering wheel can then be turned again. This is followed by a RUN position, in which an SSB or a start switch activates switching elements, which start the engine and cause the ID transmitter 20 to be locked by the latch 40. When the SSB is released or the start switch is no longer operated, then the switching elements are reset while the engine remains on. To stop the engine, either the start switch is operated again or the SSB is turned back. In this case, the latch 40 is moved into its released position 40.1, so that the ID transmitter 20 is released and can be removed again. When the ID transmitter 20 is removed, the steering wheel lock is activated.

As FIG. 1 shows, the internal components 11 that serve to secure the ID transmitter 20 in its inserted position occupy only a relatively small depth dimension 45, aside from the initial guide region 44 of the mounting plate 12. This guide region 44 could be made shorter or could be eliminated altogether. The small depth dimension 24 saves a good deal of space, which can be used for other important functional parts in the motor vehicle.

LIST OF REFERENCE NUMBERS

10 Slot for 20
11 internal components of 10

12 mounting plate
13 inner surface of 12, guide surface for 20
14 rear side of 12
15.1 pivot pin for 30.1
15.2 pivot pin for 30.2
16.1 first guide web for 24 of 20
16.2 second guide web for 24 of 20
17 tension spring
18 opening
19 guide track for 31, 32 (FIG. 2)
20 ID transmitter
21 direction of insertion of 20
22 rectangular cross section of 20 (FIG. 4)
23 wide side of 20 (FIG. 4)
24 narrow side of 20 (FIG. 4)
25.1 engaging device, recess in 24
25.2 engaging device, recess in 24
26.1 inclined surface of 20 for 35.1
26.2 inclined surface of 20 for 35.2
27 insertion end of 20 (FIG. 1)
28.1 swiveling movement of 30.1
28.2 swiveling movement of 30.2
29 swivel plane of 30.1, 30.2 (FIGS. 2, 4)
30.1 first angle level
30.2 second angle lever
31.1 first arm of 30.1, supporting arm
31.2 first arm of 30.2, supporting arm
32.1 second arm of 30.1, control arm
32.2 second arm of 30.2, control arm
33.1 control point on 32.1, projection
33.2 control point on 32.2, projection
34.1 locking point on 32.1, opening
34.2 locking point on 32.2, opening
35.1 securing means on 31.1, lug
35.2 securing means on 31.2, lug
36.1 pin on 31.1 (FIG. 4)
36.2 pin on 31.2 (FIG. 4)
37.1 spring force of 30.1 (FIG. 1)
37.2 spring force of 30.2 (FIG. 1)
38 opposing control point for 33.1, 33.2 (FIG. 3)
39 end face of 20 (FIG. 3)
40 locking device, latch of the locking mechanism (FIGS. 3, 4)
40.1 released position of 40 (FIG. 4)
40.2 locked position of 40 (FIG. 4)
41 arrow indicating reversal of 40 (FIG. 4)
42 opening in 12 for 40 (FIG. 4)
43 inserted position of 20 (FIG. 3)
44 initial guide region for 20 (FIG. 1)
45 insertion depth dimension of 11 (FIG. 1)

The invention claimed is:

1. A Device for Starting and Operating an engine in a motor vehicle,
wherein a loose ID transmitter (20), which can be inserted (21) into a stationary slot (10) of the motor vehicle and has an engaging device (25.1, 25.2) at least on one of its sidewalls (24), which extend in the direction of insertion (21),
wherein a stationary ID receiver in the vehicle, which communicates with the inserted ID transmitter (20),
wherein a two-armed angle lever (30.1, 30.2) is fixed in the slot (10) so as to be pivotable,
wherein one arm of the angle lever (30.1, 30.2) is a supporting arm (31.1, 31.2) that extends essentially in a direction of insertion (21) of the ID transmitter (20),
wherein the supporting arm (31.1, 31.2) has a securing means (35.1, 35.2), which, in the correct inserted position (43), engages the engaging device (25.1, 25.2) arranged on of the ID transmitter (20), and
another arm of the angle lever (30.1, 30.2) is a control arm (32.1, 32.2) that extends transversely to the direction of insertion (21) of the ID transmitter (20),
wherein the control arm (32.1, 32.2) has a control point (33.1, 33.2) that contacts an opposing control point (38) on an insertion end (27) of the ID transmitter (20) upon insertion of the ID transmitter (20) so that a swivel-back movement (46.1, 46.2) of the angle lever (30.1, 30.2) occurs,
wherein the swivel-back movement (46.1, 46.2) provides an engagement of the engaging device and the securing means (25.1, 35.1; 25.2, 35.2) between the supporting arm (31.1, 31.2) and the ID transmitter (20) so that the ID transmitter (20) is secured in the slot (10),
wherein the control arm (32.1, 32.2) further has a locking point (34.1, 34.2) that cooperates with a locking device (40) so as to secure the ID transmitter (20) in its inserted position (43), and
wherein the locking device (40) is movable transversely to a swivel plane (29) of the control arm (32.1, 32.2) between two positions, including
a locked position (40.2), in which the locking device (40) engages the locking point (34.1, 34.2) of the control arm (32.1, 32.2), and
a released position (40.1), in which the locking device (40) releases the locking point (34.1, 34.2).

2. A device in accordance with claim 1, wherein the ID transmitter (20) has an engaging device (25.1, 25.2) on each of its two opposite sidewalls (24),
wherein two securing means (35.1, 35.2) on the supporting arms (31.1, 31.2) of two angle levers (30.1, 30.2) are associated with the two engaging devices (25.1, 25.2),
wherein the control arms (32.1, 32.2) of the two angle levers (30.1, 30.2) overlap each other, and
wherein, in the inserted position (43) of the ID transmitter (20), the locking points (34.1, 34.2) of the two control arms (32.1, 32.2) are aligned and are engaged by the same locking device (40) in its locked position (40.2).

3. A device in accordance with claim 2, wherein the two angle levers (30.1, 30.2) are designed with the same shape but are arranged relative to each other in mirror-inverted positions.

4. A device in accordance with claim 1, wherein the engaging device on the ID transmitter (20) consists of a recess (25.1, 25.2) in the sidewall (24), and the securing means consists of a lug (35.1, 35.2) at the free end of the control arm (32.1, 32.2) of the angle lever (30.1, 30.2).

5. A device in accordance with claim 4, wherein the lug (35.1, 35.2) extends perpendicularly to the swivel plane (29) of the angle lever (30.1, 30.2).

6. A device in accordance with claim 1, wherein an inclined surface (26.1, 26.2) for the lug (35.1, 35.2) is located in front of the recess (25.1, 25.2) in the sidewall (24) of the ID transmitter (20).

7. A device in accordance with claim 1, wherein the opposing control point (38) of the insertion end (27) consists of the end face (39) of the ID transmitter (20).

8. A device in accordance with claim 7, wherein the control point of the control arm (32.1, 32.2) of the angle lever (30.1, 30.2) consists of a projection (33.1, 33.2), which, in the inserted position (43) of the ID transmitter (20), is supported on the end face (39) of the ID transmitter (20).

9. A device in accordance with claim 1, wherein the locking mechanism comprises a latch (40) that can be moved transversely to the swivel plane (29) of the angle lever (30.1, 30.2).

10. A device in accordance with claim 9, wherein, in the locked position (40.2), the latch (40) fits into the opening (34.1, 34.2), while in the released position (40.1), the latch (40) is located outside the opening (40.1, 40.2).

11. A device in accordance with claim 1, wherein the locking point consists of an opening (34.1, 34.2) in the control arm of the angle lever (30.1, 30.2).

12. A device in accordance with claim 1, wherein the angle lever (30.1, 30.2) is pivoted (15.1, 15.2) on a mounting plate (12), which extends parallel to the swivel plane (29) of the angle lever (30.1, 30.2).

13. A device in accordance with claim 12, wherein the mounting plate (12) serves as an inside boundary for the ID transmitter (20) in the slot (10).

14. A device in accordance with claim 12, wherein the mounting plate (12) has guide surfaces (13; 16.1, 16.2) that fix the insertion (21) of the ID transmitter (20).

15. A device in accordance with claim 14, wherein the ID transmitter (20) has an essentially rectangular cross section (22) and that the guide surface (16) of the mounting plate (12) guides and supports one of the wide sides (23) of the ID transmitter (20).

16. A device in accordance with claim 15, wherein the guide surfaces (16.1, 16.2) interact with at least certain sections of the narrow sides (24) of the ID transmitter (20).

17. A device in accordance with claim 12, wherein the mounting plate (12) has a guide track (19), which guides the end of the supporting arm (31, 32), which holds the securing means (35.1, 35.2).

18. A device in accordance with claim 1, wherein the angle lever (30.1, 30.2) is acted upon by a spring force (37.1, 37.2), which acts to push the securing means (35.1, 35.2) of the supporting arm (31.1, 31.2) into the engaging device (25.1, 25.2) of the ID transmitter (20).

19. A device in accordance with claim 18, wherein the angle lever (30.1, 30.2) has a pin (36.1, 36.2), on which the spring force (37.1, 37.2) acts.

20. A device in accordance with claim 19, wherein the pin (36.1, 36.2) for the spring force (37.1, 37.2) is located on the supporting arm (31.1, 31.2) of the angle lever (30.1, 30.2).

21. A device in accordance with claim 20, wherein the pin (31.1, 31.2) passes through an opening (18) in the mounting plate (12) and that the spring force (37.1, 37.2) that acts on the pin (36.1, 36.2) is located on the rear side (14) of the mounting plate (12).

22. A device in accordance with claim 21, wherein the pin (36.1, 36.2) is arranged essentially as an axial extension of the lug (35.1, 35.2) of the supporting arm (31.1, 31.2).

23. A device in accordance with claim 18, wherein a common spring (17) is assigned to the two angle levers (30.1, 30.2) and that the spring (17) acts to push the two supporting arms (31.1, 31.2) towards each other.

* * * * *